(12) United States Patent
Wesselman et al.

(10) Patent No.: US 9,616,797 B1
(45) Date of Patent: Apr. 11, 2017

(54) TRACTOR TOWING FRAME ASSEMBLY

(76) Inventors: James A. Wesselman, Effingham, IL (US); Randy Strunk, Effingham, IL (US)

( * ) Notice: Subject to any disclaimer, the term of this patent is extended or adjusted under 35 U.S.C. 154(b) by 694 days.

(21) Appl. No.: 13/443,648

(22) Filed: Apr. 10, 2012

(51) Int. Cl.
*B60P 3/06* (2006.01)
*B60P 3/12* (2006.01)

(52) U.S. Cl.
CPC .................... *B60P 3/125* (2013.01)

(58) Field of Classification Search
CPC ........................................................ B60P 3/06
USPC ........................................ 280/402; 414/563
See application file for complete search history.

(56) References Cited

U.S. PATENT DOCUMENTS

| 4,534,579 | A | 8/1985 | Shackelford, Sr. |
| 4,632,629 | A | 12/1986 | Kooima |
| 4,797,058 | A | 1/1989 | Bilas |
| 4,840,534 | A | 6/1989 | Totty |
| 5,391,044 | A * | 2/1995 | Young ............................ 414/563 |
| D368,416 | S | 4/1996 | Holman et al. |
| 7,153,082 | B2 | 12/2006 | Nolasco |
| 7,318,698 | B1 * | 1/2008 | Gipson .......................... 414/563 |
| 7,789,411 | B2 * | 9/2010 | Schuettenberg .............. 280/402 |
| 2005/0158161 | A1 * | 7/2005 | Shubert ......................... 414/563 |

* cited by examiner

*Primary Examiner* — Joseph Rocca
*Assistant Examiner* — Felicia L Brittman

(57) ABSTRACT

A tractor towing frame assembly is provided for lifting front wheels of a tractor to facilitate towing of the tractor. The assembly includes a pair of side arms each having a connector configured for coupling to a tow lift arm such that the side arms extend from the tow lift arm in spaced relationship to each other. A bracket has a pair of spaced connection arms and a cross member extending between the connection arms. The connection arms are coupled to the side arms for engaging and supporting a wheel of a tractor. A chain has a first end coupled to one of the side arms and a second end coupled to the bracket. The chain passes over an axle extending through the wheel of the tractor. A strap is coupled to and extends from the cross member to facilitate coupling the chain.

11 Claims, 5 Drawing Sheets

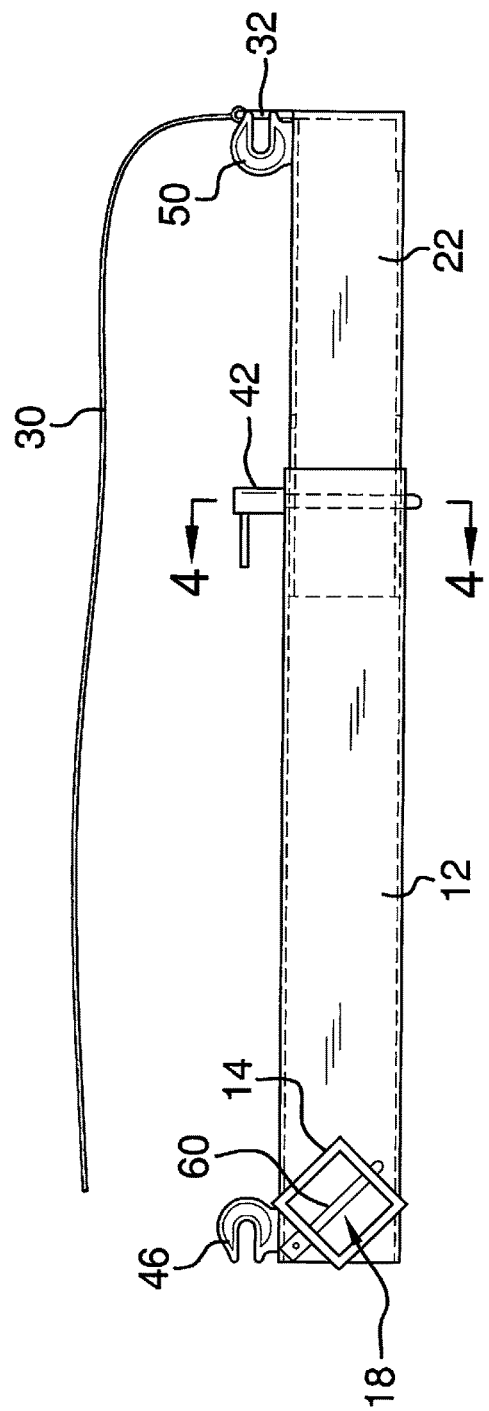
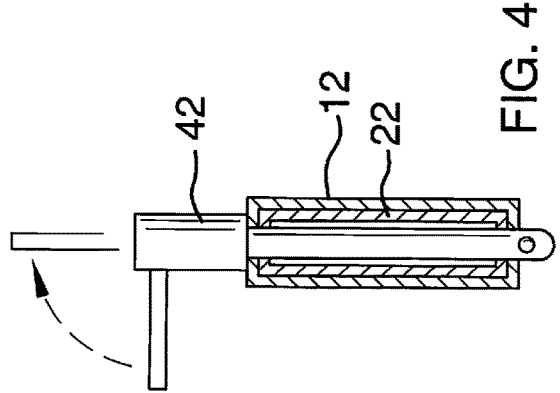

TRACTOR TOWING FRAME ASSEMBLY

BACKGROUND OF THE DISCLOSURE

Field of the Disclosure

The disclosure relates to towing frame devices and more particularly pertains to a new towing frame device for lifting front wheels of a tractor to facilitate towing of the tractor.

SUMMARY OF THE DISCLOSURE

An embodiment of the disclosure meets the needs presented above by generally comprising a pair of side arms each having a connector configured for coupling to a tow lift arm such that the side arms extend from the tow lift arm in spaced relationship to each other. A bracket has a pair of spaced connection arms and a cross member extending between the connection arms. The connection arms are coupled to the side arms for engaging and supporting a wheel of a tractor. A chain has a first end coupled to one of the side arms and a second end coupled to the bracket. The chain passes over an axle extending through the wheel of the tractor. A strap is coupled to and extends from the cross member to facilitate coupling the chain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a cross-sectional view of an embodiment of the disclosure taken along line 4-4 of FIG. 3.

DESCRIPTION OF THE PREFERRED EMBODIMENT

Figure 1:
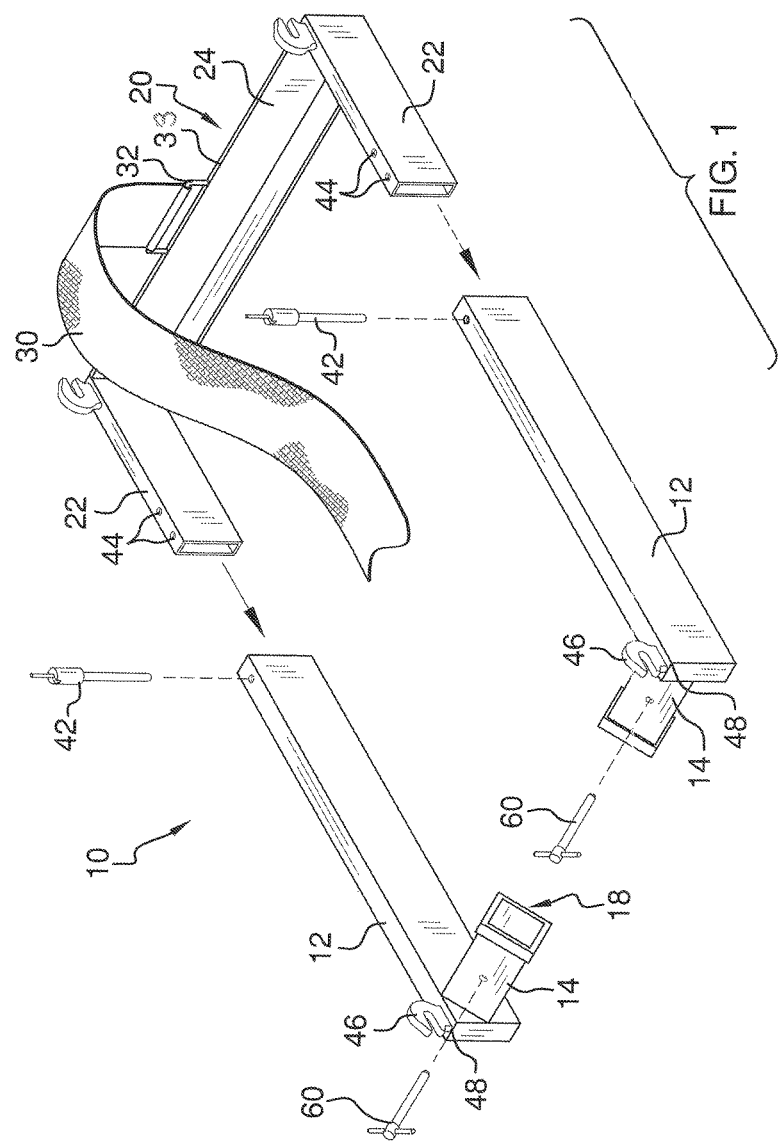
FIG. 1 is a top front side perspective exploded view of a tractor towing frame assembly according to an embodiment of the disclosure.
Figure 2:
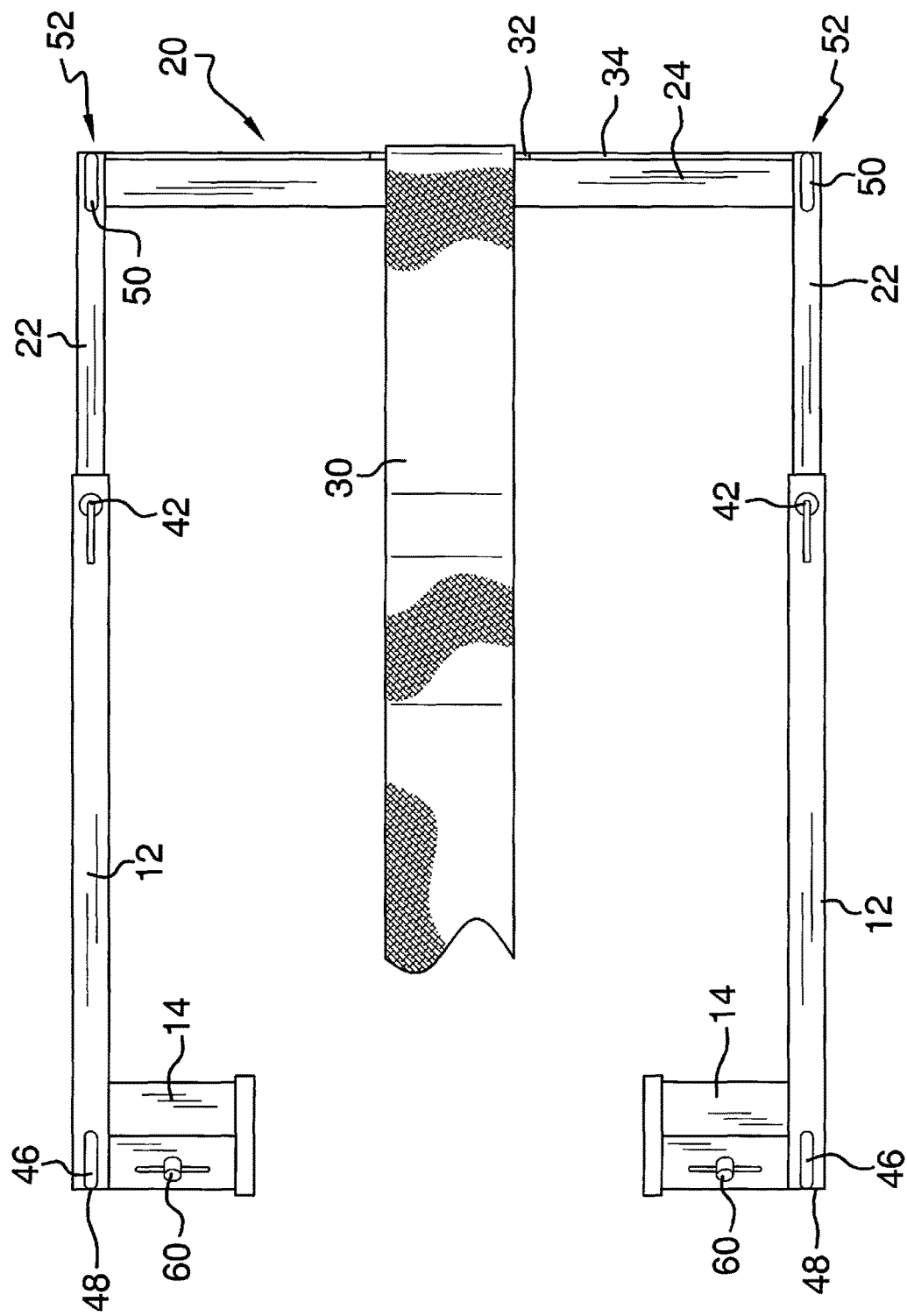
FIG. 2 is a top view of an embodiment of the disclosure.

With reference now to the drawings, and in particular to FIGS. 1 through 6 thereof, a new towing frame device embodying the principles and concepts of an embodiment of the disclosure and generally designated by the reference numeral 10 will be described.

As best illustrated in FIGS. 1 through 6, the tractor towing frame assembly 10 generally comprises a pair of side arms 12. Each side arm 12 has a tubular connector 14 configured for receiving and coupling to a tow lift arm 16 such that the side arms 12 extend from the tow lift arm 16 in spaced relationship to each other. The connector 14 extends transversely from the side arm 12 and has a square cross-sectional shape 18. A bracket 20 has a pair of spaced connection arms 22 and a cross member 24 extending between the connection arms 22. The connection arms 22 are selectively coupled to the side arms 12 whereby the side arms 12 and the bracket 20 are configured for engaging and supporting a wheel 26 of a tractor 28. Each of the connection arms 22 is slidably inserted into an associated one of the side arms 12. A strap 30 is coupled to and extends from the cross member 24. A loop 32 may be coupled to an upper edge 33 of the cross member 24 of the bracket 20. The loop 32 may also be centrally aligned on the cross member 24. The strap 30 is coupled to the loop 32.

A pair of locking pins 42 may be provided. Each locking pin 42 is inserted through an associated one of the connection arms 22 and the associated one of the side arms 12 whereby the bracket 20 is secured to the side arms 12. A plurality of spaced holes 44 is positioned in each connection arm 22 such that the bracket 20 is positionable to extend a selectable length from the side arms 12 to accommodate variously sized wheels 26.

A first chain 34 has a first end 36 coupled to one of the side arms 12 and a second end 38 coupled to the bracket 20. The chain 34 is configured for passing over an axle 40 extending through the wheel 26 of the tractor 28. A pair of side arm hooks 46 is provided with each side arm hook 46 being coupled to an associated one of the side arms 12. Each side arm hook 46 may be attached at a distal end 48 of the side arm 12 relative to the bracket 20. The first end 36 of the chain 34 is coupled to one of the side arm hooks 46.

Similarly, a pair of bracket hooks 50 may be coupled to the bracket 20. Each bracket hook 50 may be positioned at a junction 52 between an associated one of the connection arms 22 and the cross member 24. The second end 38 of the chain 34 is coupled to one of the bracket hooks 50 such that the chain 34 is aligned along a coupled side arm 12 and connection arm 22. A second chain 54 having a first end 56 coupled to another one of the side arm hooks 46 and a second end 58 coupled to another of the bracket hooks 50 so that the second chain 54 extends along the other coupled side arm 12 and connection arm 22.

A pair of locking pegs 60 is provided. Each locking peg is insertable through the connector 14 of a selectable one of the side arms 12 whereby each locking peg 60 is configured for securing each side arm 12 to the tow lift arm 16.

Figure 5:
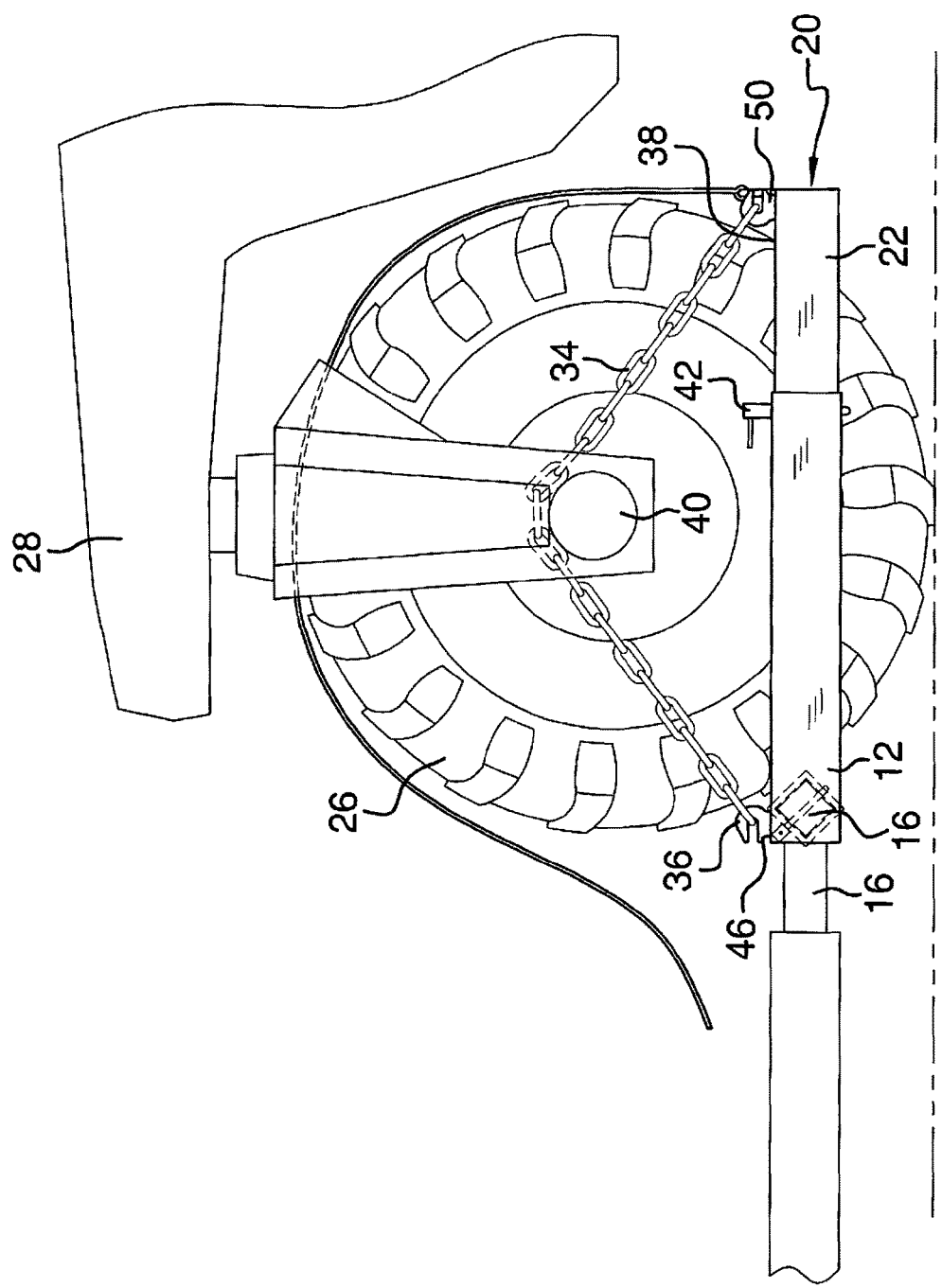
FIG. 5 is a side view of an embodiment of the disclosure in use.
Figure 6:
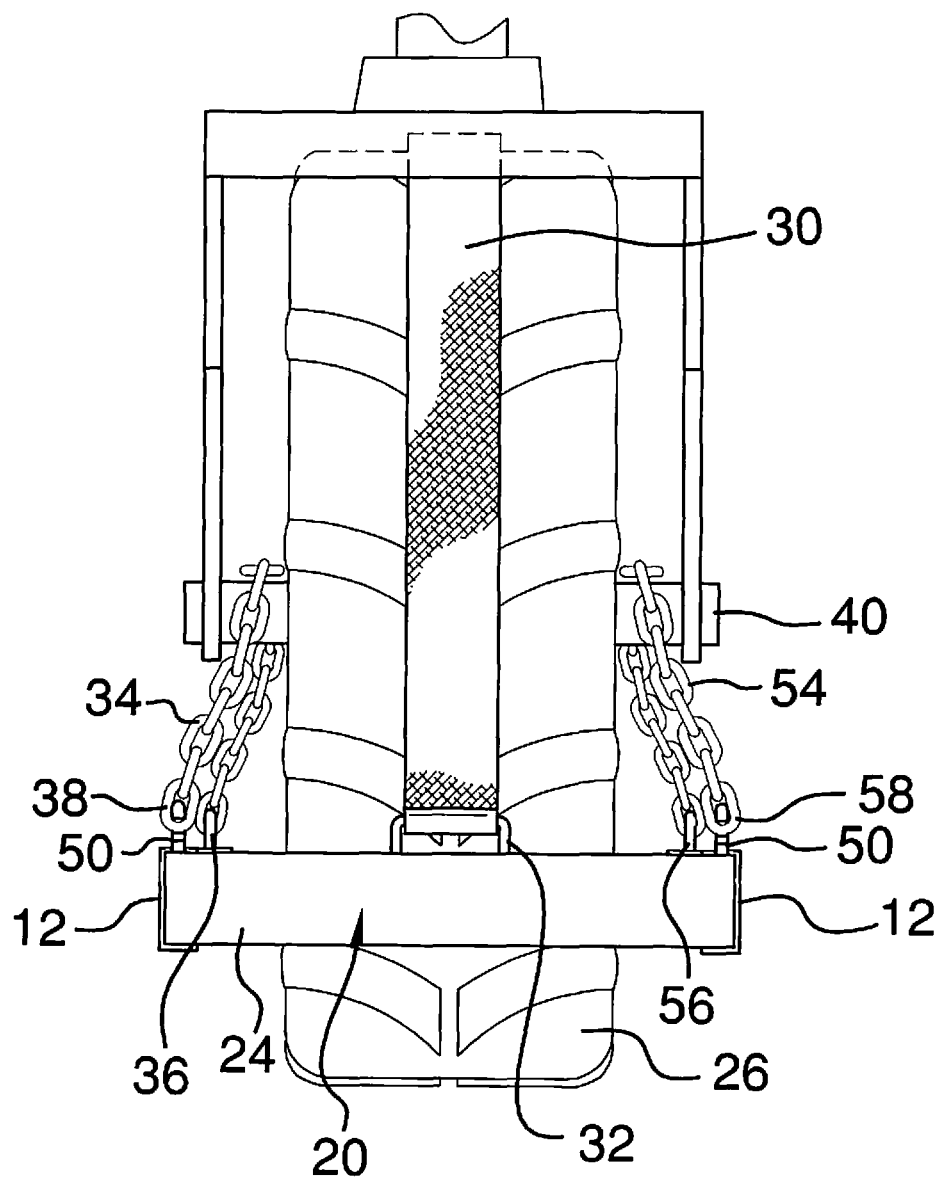
FIG. 6 is a rear view of an embodiment of the disclosure in use.

In use, the tow lift arm 16 is positioned adjacent to the wheel 26 of the tractor 28. The side arms 12 are coupled to the tow lift arm 16 using the connectors 14 and locking pegs 60 to position the side arms 12 on opposite sides of the wheel 26. The connection arms 22 of the bracket 20 are then inserted into the side arms 12 and secured at the desired position using the locking pins 42. The strap 30 is positioned over the wheel 26 as shown in FIG. 5 and may be pulled to assist in lifting the tow lift arm 16 relative to the wheel 26 facilitating taut securing of the first chain 34 and second chain 54 to the side arms 12 and bracket 20 extending over the axle 40 on opposite sides of the wheel 26. A ratchet type chain boomer may be employed to tighten the chain 34. This secures the wheel 26 within the assembly 10 safely coupling the wheel 26 to the tow lift arm 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A tractor tow frame assembly comprising:
   a pair of side arms, each side arm having a connector such that a pair of connectors is defined, said connectors being configured for coupling to a tow lift arm such that said side arms extend from the tow lift arm in spaced relationship to each other, said connectors being positioned such that said connectors are positioned forward of a wheel of a tractor when said assembly engages the wheel;
   a bracket, said bracket having a pair of spaced connection arms and a cross member extending between said connection arms, said connection arms being selectively coupled to said side arms whereby said side arms and said bracket are configured for engaging and supporting the wheel of a tractor, said cross member being positioned such that said cross member is located rearward of the wheel when said assembly engages the wheel;
   a strap coupled to and extending from said cross member, said strap being elongated and being extendable over the wheel such that a free end of said strap is positionable adjacent to said connectors and said cross member is liftable with respect to said wheel with said strap, said strap having only a single connected end; and
   a chain having a first end coupled to one of said side arms and a second end coupled to said bracket, said chain being configured for passing over an axle extending through the wheel of the tractor.

2. The assembly of claim 1, further including each of said connection arms being slidably inserted into an associated one of said side arms.

3. The assembly of claim 2, further including a pair of locking pins, each locking pin being inserted through an associated one of said connection arms and said associated one of said side arms whereby said bracket is secured to said side arms.

4. The assembly of claim 3, further including a plurality of holes positioned in each connection arm whereby said bracket is positionable to extend a selectable length from said side arms.

5. The assembly of claim 1, further including a pair of side arm hooks, each side arm hook being coupled to an associated one of said side arms, said first end of said chain being coupled to one of said side arm hooks.

6. The assembly of claim 5, further including a second chain, said second chain having a first end coupled to another one of said side arm hooks and a second end coupled to said bracket whereby said second chain is configured for extending over the axle of the wheel of the tractor.

7. The assembly of claim 5, further comprising:
   a pair of bracket hooks coupled to said bracket, said second end of said chain being coupled to one of said bracket hooks; and
   a second chain having a first end coupled to another one of said side arm hooks and a second end coupled to another of said bracket hooks.

8. The assembly of claim 1, further including a pair of bracket hooks coupled to said bracket, said second end of said chain being coupled to one of said bracket hooks.

9. The assembly of claim 1, further including said connectors extending transversely from said side arm, said connectors having a square cross-sectional shape.

10. The assembly of claim 9, further including a pair of locking pegs, each locking peg being insertable through said connector of a selectable one of said side arms whereby each locking peg is configured for securing each said side arm to the tow lift arm.

11. The assembly of claim 1, further including a loop coupled to an upper edge of said cross member of said bracket, said strap being coupled to said loop.

* * * * *